United States Patent Office 3,642,745
Patented Feb. 15, 1972

3,642,745
PROCEDURE FOR THE POLYMERIZATION AND COPOLYMERIZATION OF VINYL CHLORIDE
Jean Golstein, Brussels, Belgium, assignor to Solvay & Cie, Brussels, Belgium
No Drawing. Filed June 5, 1969, Ser. No. 830,876
Claims priority, application Belgium, June 7, 1968, 56,220
Int. Cl. C08f 3/30
U.S. Cl. 260—87.5 C                12 Claims

ABSTRACT OF THE DISCLOSURE

Vinyl chloride is polymerized and copolymerized in the absence of a dispersing agent and in the presence of a dispersion of an inert solid and a catalyst in a liquid which is not a solvent for the monomeric compounds undergoing polymerization or copolymerization, at a pressure and below the saturated vapor pressure of the monomeric compounds. Crusting on the polymerization reactor is avoided and a product of high purity is produced by means of the present process.

BACKGROUND OF THE INVENTION

The present invention concerns an improved method for carrying out the polymerization and copolymerization of vinyl chloride.

The standard processes of polymerization of vinyl chloride and, more particularly, processes carried out by means of suspension and by emulsion, have a serious disadvantage; crusting or caking in the polymerization autoclave occurs during the reaction.

The crusts or cakes formed on the walls of the reactor, principally due to the presence of liquid vinyl chloride, contaminates the finished products and renders the polymerization reaction progressively more difficult to control, which reduces the yield and efficiency of polymerization.

If the polymerization process is carried out by means of an irregular or intermittent process, this difficulty can be remedied by cleaning the polymerization autoclaves under pressure; however this cannot be done when a continuous polymerization process is used.

The crusting or caking of the polymerization reactors is a difficulty which has generally prevented the successful development and use of continuous industrial processes for the polymerization of vinyl chloride.

SUMMARY OF THE INVENTION

A principal object of the present invention is the provision of a process for the polymerization and copolymerization of vinyl chloride wherein crusting and caking in the polymerization zone is avoided.

Another object of the present invention is the provision of an improved process for polymerizing and copolymerizing vinyl chloride.

Still another object of the present invention is the provision of a process for polymerizing and copolymerizing vinyl chloride whereby the efficiency of the process and the quality of the product are improved.

It has been found that vinyl chloride may be polymerized and copolymerized without the formation of crusts and cakes in the reaction zone by introducing the monomer or monomers to the reaction zone in the gaseous state and maintaining them in this state during the entire polymerization process.

According to the present invention polymerization of vinyl chloride and copolymerization of vinyl chloride with one or more copolymerizable compounds is carried out in the absence of a dispersing agent, in the midst of a dispersion of a solid in a liquid which is not a solvent for the monomers undergoing polymerization and in the presence of one or more radical catalysts. The monomer or monomers are introduced into polymerization zone in the gaseous state and the prevailing pressure in the polymerization zone is maintained at all times below the saturated vapor pressure of the monomer or monomers to be polymerized.

DESCRIPTION OF THE PREFERRED EMBODIMENTS

According to an embodiment of the process of the invention, water, a solid support and a small quantity of catalyst are introduced to a polymerization autoclave, which is provided with means for agitation, the reactants are heated to the temperature at which the polymerization is to be carried out and then gaseous vinyl chloride is introduced to the agitated mixture in the autoclave.

The prevailing pressure in the autoclave may be variable; however, at all times it must be lower than the saturated vapor pressure of the vinyl chloride at the polymerization temperature, so that during the entire polymerization reaction, no liquid vinyl chloride is present in the reaction medium. The expression, saturated vapor pressure has the usual meaning as referred to herein, i.e. the pressure at which the vapor phase of a compound is in equilibrium with the liquid phase; the saturated vapor pressure, of course, varies with the temperature. Thus, according to the present process, the presence of monomer in the liquid phase is avoided by carrying out polymerization at a pressure lower than that of the saturated vapor pressure of the monomer.

If the process of the present invention is carried out without employing a solid substance, the resultant poly(vinyl chloride) possesses generally poor properties. In other words, the presence of the solid substance in the medium of polymerization is necessary in order to obtain resins which possess desirable characteristics.

The solid substance introduced to the polymerization reaction and dispersed in the liquid medium must be granular and inert under the conditions of polymerization.

Any type of solid material can be employed in the present process providing it does not constitute or contain an inhibitor of polymerization.

More particularly the following solid substances can be employed: asbestos, silica, perlite, and the like. However, it is preferable to employ plastic materials in the form of powder or granules, and, more particularly poly(vinyl chloride) itself or a resin which is desirably used in admixture with the poly(vinyl chloride) to be obtained.

While the granulometry of the solid phase is not critical with regard to the polymerization process, it is with regard to the properties of the final product.

If a porous resin is desired, according to the present process, it is preferable that the solid substance introduced to the polymerization reaction be porous.

In this respect, it has been discovered that poly(vinyl chloride) which is particularly suitable is that obtained by means of polymerization in suspension in a water/isopropanol medium the gravimetric ratio of which is comprised between 150/50 and 190/10.

The quantity of solid phase employed is variable and the solid/monomer phase ratio to be polymerized is not critical. The quantity of solid phase employed in the present process is very variable and depends on its nature, i.e. chemical composition and physical structure, and its granulometry. As a general rule, however the quantity of solid phase may be reduced when the size of the solid particles are smaller. It is usually necessary to add at least 5% by weight, based on the weight of monomer employed of solid phase, below this limit crusting or caking is observed. The quantity of solid phase employed is comprised between 5 and 100 percent by weight and preferably 8 and 30 percent by weight of solid phase based on the weight of monomer or monomers employed.

All of the catalysts and catalytic systems customarily employed for the polymerization of vinyl chloride may be utilized as catalysts for the present polymerization as long as they are insoluble in the dispersion medium. The free radical generating catalysts generally utilized for polymerization in aqueous suspension are especially preferred, such as organic peroxides which may be employed alone or in combination, including for example, lauroyl peroxide, benzoyl peroxide, peroxydicarbonates, azobis-isobutyronitrile, tert-butyl perpivalate etc.

The quantity of catalyst employed is preferably comprised between 0.01 and 5% in weight based on the weight of monomer or monomers employed.

The catalysts employed in the present invention can be dispersed on the solid substance. However, it is preferable to introduce the solid substance and the catalyst separately to the reaction zone; it has been observed, surprisingly, that this method of operation improves the yield and efficiency of polymerization.

In so far as the dispersion liquid is concerned, all liquids can be used which are not solvents for the polymer or for the monomer or monomers to be polymerized and which are inert under the polymerization conditions. Water is preferably used as the liquid dispersion medium.

The quantity of liquid employed is not critical, however, it must be sufficient to obtain a dispersion which can be stirred or agitated. Therefore, it is desirable to maintain the liquid/final polymer phase gravimetric ratio above 0.5.

The agitation of the reaction medium has no effect on the characteristics of the resultant resin grains, however it influences the kinetics of the reaction.

Consequently, the agitators are customarily employed in the liquid phase during polymerization which provides excellent mixing of the entire reaction.

The present process is also suitable for the copolymerization of vinyl chloride with copolymerization monomers such as vinylidene chloride, ethylene, propylene, isobutene, etc.

By means of the process of the invention, it is also possible to obtain resins having an improved stabilization by incorporating stabilizers in the key solid substance, providing that the stabilizers are not inhibitors of the polymerization reaction.

According to a variant of the process, it is also possible to make use of stabilizers as the solid substance. Solid materials which are also effective as stabilizers include salts of fatty acids and, more particularly, for example calcium, lead, barium and cadmium stearates etc. which may be used in the form of powders in the present process.

These techniques assure better dispersion of the stabilizer in the resin and thereby it is possible to obtain a more efficient resin. The quantity of stabilizers employed is preferably comprised between 0.1 and 5% by weight based on the weight of polymer obtained.

The overall characteristics of the process, and, more particularly, the absence of the crusting or caking of the reactor, make it especially adaptable for a continuous process. Continuous processes carried out using the present procedure are highly advantageous and may be successfully operated for a long period of time without the necessity of stopping in order to clean the polymerization reactor. This is an important advantage in view of the fact that at the present time only very few techniques are available which satisfactorily allow for the polymerization of vinyl chloride by means of a continuous process.

However, if the process of the invention is particularly advantageous for polymerization by continuous means, it is quite evident that it is also applicable for irregular and intermittent operations and such processes also have important advantages.

The process of the invention is particularly economical by virtue of the absence of crusting or caking in the reactors of polymerization. It has also been found that there is a considerable increase of the effective rate of resin production using the same autoclave.

Another particularly important advantage of the process of the invention is that resins having a high degree of purity are obtained; thus resins having excellent transparency and capable of rapid adsorption of stabilizers and plasticizers are obtained by means of the present invention. This is related principally to a feature of the present process; namely that the polymerization reaction is carried out without incorporating a dispersing agent. The use of a dispersing agent results in the contamination of the polymer during polymerization.

Further, by virtue of the absence of a dispersion agent in the reaction medium, the resins obtained from the present process do not require a washing operation.

Another characteristic of the invention, wherein a plastic material is employed as the solid substance, is the feature that such material does not have to be dried before it is introduced into the polymerization zone in view of the fact that it is dispersed therein in the liquid dispersion medium.

The process according to the invention also makes it possible to obtain low molecular weight resins easily employing much lower pressure than is usually necessary in customary processes, wherein polymerization is carried out in suspension, emulsion or in a mass.

The resins obtained by means of the new process possess excellent absorption properties with respect to plasticizers.

A particularly interesting and economical advantage of the present process is that no substantial modification or changes in the standard polymerization installations are required for its implementation; it can be put into practice simply in the autoclaves employed for the previous standard polymerization processes which use emulsion or aqueous suspension techniques.

The following examples further illustrate the best mode currently contemplated for carrying out the present process; but these examples must not be construed as limiting the scope of the invention in any manner whatsoever.

EXAMPLE 1

Polymerization of vinyl chloride

One g. of lauroyl peroxide in fine powder form, 100 g. of pulverized poly(vinyl chloride), (Solvic 228) and 1500 g. of water are introduced in an autoclave of 3 l. capacity.

The mixture is stirred in a continuous manner during the period of polymerization with the aid of a vertical blade agitator rotating at a speed of 500 revolutions per minute.

The polymerization autoclave is heated to 58° C. and is then put in communication with the gaseous phase of a feed autoclave containing 940 ml. of liquid vinyl chloride, so as to bring the pressure in the polymerization autoclave to 8 kg./cm.$^2$, the saturated vapor pressure of vinyl chloride at the temperature of polymerization (58° C.) is 10 kg./cm.$^2$.

The polymerization reaction starts and as soon as a drop in pressure of 3 kg./cm.$^2$ is observed with respect to the initial pressure, the gases are removed and 850 g. of poly(vinyl chloride) are collected.

EXAMPLE 2

Polymerization of vinyl chloride

The following is introduced in an autoclave of 3 l. capacity, subjected to a continuous stirring or agitation with the aid of a vertical blade agitator rotating at the speed of 500 revolutions per minute: 1 g. of lauroyl peroxide in fine powder form, 1500 g. of water and 100 g. of a porous poly(vinyl chloride) obtained by means of polymerization in suspension in a water/isopropanol medium, the gravimetric ratio of which is on the order of 160/40 and having the following characteristics:

Apparent specific weight by settling: 0.45 kg./dm.$^3$
Screen analysis: comprised between 63 and 42 microns
Grains: round and in a mass After having brought the polymerization autoclave to 59° C., gaseous vinyl chloride is introduced.

The prevailing pressure in the autoclave is 8 kg./cm.$^2$. The start of the polymerization reaction is observed by a drop in pressure. The pressure is maintained at 8 kg./cm.$^2$ by means of successive introductions of gaseous vinyl chloride with the aid of an automatic valve regulating the pressure of the autoclave.

After a reaction period of 6 hours, the introduction of gaseous vinyl chloride is stopped and 850 g. of poly(vinyl chloride) are collected having the following characteristics:

Apparent specific weight by settling: 0.63 kg./dm.$^3$
Screen analysis: comprised between 180 and 88 microns
Grains: round and in a mass No crusting or caking is observed on the walls of the autoclave of polymerization.

EXAMPLES 3–7

Polymerization of vinyl chloride using catalysts in varying proportions

The process is carried out according to the technique and under the conditions described in Example 1, but by employing as a catalyst the different compounds listed in Table 1 hereinafter:

TABLE 1

| Examples | 3 | 4 | 5 | 6 | 7 |
|---|---|---|---|---|---|
| Catalysts. g.: | | | | | |
| Lauroyl peroxide | 1 | 0.6 | 0.3 | | |
| Azo-bis-isobutyronitrile | | | | 1 | 0.6 |
| Duration of reaction, hours | 4.5 | 6 | 12.5 | 5.3 | 10 |
| Quantities of polymerized poly(vinyl chloride) g | 821 | 778 | 837 | 843 | 800 |

No crusting or caking was observed in the polymerization autoclaves and the resins obtained have similar characteristics and, more particularly, an excellent and rapid adsorption of plasticizers and stabilizers.

EXAMPLE 8

The polymerization of vinyl chloride in the presence of a stabilizer

One hundred g. of dense poly(vinyl chloride), (Solvic 223), 1 g. of lauroyl peroxide, 1500 g. of water and 1 g. of calcium stearate are introduced into the autoclave.

The autoclave, heated to 60° C., is agitated in a continuous manner with the aid of a vertical blade mixer rotating at 500 revolutions per minute.

Gaseous vinyl chloride is then introduced into the polymerization autoclave and the pressure of 8 kg./cm.$^2$ is maintained by means of successive introductions of gaseous vinyl chloride.

The polymerization is stopped after a period of 6 hours and 860 g. of poly(vinyl chloride) are collected, the thermal stability of which measured in an oil bath at 160° C., is 25/35 minutes. The thermal stability of a poly(vinyl chloride) obtained according to Example 1 is on the order of from 10 to 20 minutes.

The stabilizer can also be introduced during the course of polymerization.

EXAMPLE 9

The copolymerization of vinyl chloride and propylene

The following is introduced to an autoclave of 35 l. capacity: 20 g. of lauroyl peroxide, 17,000 g. of water and 800 g. of a porous poly(vinyl chloride) obtained by means of polymerization is suspension in a water/isopropanol medium, possessing a K number measured on a solution in the dichlorethane of 52.4 and an apparent specific weight by settling of 0.47 kg./cm.$^3$.

The mixture is stirred in a continuous manner with the aid of a vertical blade agitator rotating at 350 revolutions per minute.

A mixture in constant proportions of 8840 parts vinyl chloride and 160 parts propylene is then introduced into the autoclave, at a temperature of 63° C. The prevailing pressure in the autoclave is 9.5 kg./cm.$^2$.

After degassing the untransformed monomers, a copolymer of vinylchloride-propylene containing 2% propylene is collected.

The K number measured in a solution of dichloroethane is 54 whereas the K number of poly(vinyl chloride) obtained under the same conditions is 59.

The apparent specific weight by settling of the copolymer is 0.61 kg./dm.$^3$.

EXAMPLE 10

The copolymerization of vinyl chloride and isobutene

The process is carried out under the same conditions as those described in Example 9, with the exception that 7900 parts vinyl chloride and 80 parts isobutene are introduced, the temperature of the autoclave is brought to 66° C. and the prevailing pressure in the autoclave is 10.5 kg./cm.$^2$.

After degassing to remove the untransformed monomers, of vinylchloride-isobutene copolymer is collected containing 1% isobutene.

The K number measured in a solution of dichloroethane is 55, whereas the K number of poly(vinyl chloride) obtained under the same conditions is 60.4.

The apparent specific weight by settling of the copolymer is 0.59 kg./dm.$^3$.

What I claim and desire to secure by Letters Patent is:

1. Process for polymerization and copolymerization of vinyl chloride which comprises introducing monomer to be polymerized in the gaseous state to a polymerization zone, maintaining the pressure in said polymerization zone below the saturated vapor pressure of said monomer and carrying out the polymerization of said monomer in said polymerization zone in the absence of material which acts as a dispersing agent and in the midst of agitated dispersion of an inert solid supoprt in powder or granular form in an amount of at least 5% by weight based on the weight of said monomer and at least one oil-soluble or monomer soluble free radical polymerization catalyst in a liquid which is not a solvent for said monomer.

2. Process according to claim 1 in which said inert solid is comprised of a resin in powder or granular form.

3. Process according to claim 1 in which said inert solid is comprised of poly(vinyl chloride) in powder or granular form.

4. Process according to claim 1 in which is inert solid is comprised of poly(vinyl chloride) produced by suspension polymerization in a water/isopropanol medium, the gravimetric ratio of which is comprised between 150/50 and 190/10.

5. Process according to claim 1 in which said inert solid is selected from at least one member of the group which consists of asbestos, silica and perlite.

6. Process according to claim 1 in which said polymerization is carried out in the presence of a stabilizer which is contained in said agitated suspension.

7. Process according to claim 1 which is carried out in a continuous manner.

8. Process according to claim 3 which is carried out in a continuous manner.

9. Process according to claim 6 which is carried out in a continuous manner.

10. Process according to claim 1 in which vinyl chloride is polymerized.

11. Process according to claim 1 in which vinyl chloride is copolymerized with a polymerizable monomer selected from the group consisting of ethylene, propylene, isobutene and vinylidene chloride.

12. Process according to claim 1, in which said inert solid is present in an amount of about 8 to 30% by weight, based on the weight of said monomer.

References Cited

UNITED STATES PATENTS

| | | | |
|---|---|---|---|
| 2,829,133 | 4/1958 | De Coene | 260—92.8 |
| 2,868,765 | 1/1959 | Haefner et al. | 260—92.8 |
| 2,979,492 | 4/1961 | Governale et al. | 260—92.8 |
| 3,055,876 | 9/1962 | Grotz | 260—92.8 |

OTHER REFERENCES

Schildknecht, C. E.: Polymer Processes, 1956, pp. 71–75. Interscience Publishers Inc., New York.

JAMES A. SEIDLECK, Primary Examiner

J. A. DONAHUE, JR., Assistant Examiner

U.S. Cl. X.R.

260—87.7, 92.8 W, 884